United States Patent [19]
Seino et al.

[11] Patent Number: 6,045,903
[45] Date of Patent: Apr. 4, 2000

[54] HYDROPHILIC ARTICLE AND METHOD FOR PRODUCING SAME

[75] Inventors: Takashi Seino, Kanagawa; Yasuaki Kai, Yokohama; Satoko Sugawara, Kanagawa, all of Japan

[73] Assignee: Nissan Motor Co., Ltd., Yokohama, Japan

[21] Appl. No.: 09/092,857

[22] Filed: Jun. 8, 1998

[30] Foreign Application Priority Data

Jun. 9, 1997 [JP] Japan .................................. 9-150877

[51] Int. Cl.[7] .................................. B32B 5/16; B05D 5/06
[52] U.S. Cl. .......................... 428/331; 428/432; 428/450; 106/13; 106/287.19; 427/165; 427/397.7
[58] Field of Search .................................. 428/428, 432, 428/450, 472, 331; 106/13, 286.4, 287.19, 287.34; 427/165, 397.7

[56] References Cited

U.S. PATENT DOCUMENTS 4,214,908  7/1980  Deguchi et al. .................. 106/13

FOREIGN PATENT DOCUMENTS

| 816466 A1 | 1/1998 | European Pat. Off. . |
| 19802392 A1 | 7/1998 | Germany . |
| 52-101680 | 8/1977 | Japan . |
| 53-58492 | 5/1978 | Japan . |
| 54-105120 | 8/1979 | Japan . |
| 55-154351 | 12/1980 | Japan . |
| 05302173 | 11/1993 | Japan . |
| 08175627 | 7/1996 | Japan . |
| 09011412 | 1/1997 | Japan . |
| 09059041 | 3/1997 | Japan . |
| 10-237353 | 8/1998 | Japan . |
| 2 015 989 | 9/1979 | United Kingdom . |
| 2015989 | 9/1979 | United Kingdom . |
| 3828137 A1 | 3/1989 | United Kingdom . |
| 2316687 | 4/1998 | United Kingdom . |
| 96/29375 | 9/1996 | WIPO . |

*Primary Examiner*—Deborah Jones
*Assistant Examiner*—Stephen Stein
*Attorney, Agent, or Firm*—Foley & Lardner

[57] ABSTRACT

The invention relates to a hydrophilic article having (a) a substrate; and (b) a hydrophilic film formed on the substrate. This film has a hydrophilic outermost layer containing (1) a titania; (2) an amorphous oxide in an amount of from 5 to 25 wt % based on the total weight of the outermost layer; and (3) silica particles having a particle diameter of from 3 to 20 nm. A combination of the titania and the amorphous oxide constitutes the hydrophilic outermost layer's matrix phase (continuous phase), and the silica particles constitute the disperse phase distributed over the matrix phase. The hydrophilic outermost layer is superior in abrasion resistance and duration of hydrophilicity. The hydrophilic article is produced by a method including sequential steps of (a) providing a sol mixture comprising a first sol containing a precursor of the titania, a second sol containing a precursor of the amorphous oxide, and a silica colloidal solution containing the silica particles; (b) applying the sol mixture to the substrate, thereby to form thereon a precursory film; and (c) baking the precursory film into the outermost layer.

21 Claims, No Drawings

HYDROPHILIC ARTICLE AND METHOD FOR PRODUCING SAME

The contents of Japanese Patent Application No. 9-150877 having a filing date of Jun. 9, 1997 are hereby incorporated by reference.

BACKGROUND OF THE INVENTION

The present invention relates to a hydrophilic article having a hydrophilic film formed on the surface of a substrate such as glass plate, mirror, metal article, or the like.

Hitherto, for example, inorganic plate glass has widely been used for various articles such as window pane, mirror and eyeglass lenses, by the reason of its transparency and other good characteristics. When such article is used, for example, in a place of high temperature and high humidity, the dew condensation is caused on its surface, thereby to fog the same. In addition to this fogging problem, there has been another problem, for example, in the automotive outside mirror, to have many raindrops on its surface in the rainy weather. These problems interfere with the automotive rear view of the driver. Thus, there have been various proposals to provide the above-mentioned articles with antifogging property, water-drops preventive property, and durability. For example, there has been a proposal to form a hydrophilic film on the surface of a substrate such as glass plate, for the purpose of preventing fogging and the water-drops attachment thereto. There has been known for a long time a proposal of applying a surface active agent to the surface of such substrate, for achieving this purpose. For example, Japanese Patent Unexamined Publication JP-A-52-101680 discloses an antifogging agent for transparent article such as glass. This agent contains polyacrylic acid, a surface active agent, and a solvent that is water and/or alcohol. JP-A-55-154351 discloses a hydrophilic film formed on substrate. This film contains a phosphorus oxide and at least one of a molybdenum oxide and a tungsten oxide. JP-A-54-105120 discloses a method for producing an antifogging glass article by contacting an inorganic glass substrate containing $P_2O_5$, with a $P_2O_5$—containing liquid or vapor. Furthermore, JP-A-53-58492 discloses an antifogging agent containing at least one sulfonic-acid-type amphoteric surface active agent represented by a general formula disclosed therein, and at least one particular inorganic salt or acetate represented by a general formula disclosed therein. International Laid-open Publication WO96/29375 discloses a method of photocatalytically making the surface of a base material ultrahydrophilic. This method comprises the step of coating the surface with a layer containing photocatalytic semiconductor material such as titania and the step of photoexciting the photocatalytic material. In this publication, there is disclosed a photocatalytic coating formed on a substrate. This coating, which is superior in abrasion resistance, is composed of a mixture of titania and silica. There is further disclosed in this publication that such coating is formed on a substrate at first by preparing a sol mixture of an anatase-type titania sol and a colloidal silica sol, then by spraying the sol mixture onto the substrate, and then by baking the coated substrate. There is a demand for a hydrophilic film that has a long time duration in hydrophilicity.

SUMMARY OF THE INVENTION

It is therefore an object of the present invention to provide a hydrophilic article having a hydrophilic film formed on a substrate, which film has a long time duration in photocatalytic oxidative activity and hydrophilicity.

It is a more specific object of the present invention to provide a hydrophilic article having such hydrophilic film that is superior in water resistance and salt water resistance.

It is another object of the present invention to provide a hydrophilic article having such hydrophilic film that is superior in abrasion resistance or scratch resistance.

It is still another object of the present invention to provide a method for producing such hydrophilic article.

According to the present invention, there is provided a hydrophilic article comprising (a) a substrate; and (b) a hydrophilic film formed on the substrate. This film has a hydrophilic outermost layer comprising (1) a titania; (2) an amorphous oxide in an amount of from 5 to 25 wt % based on a total weight of the outermost layer; and (3) silica particles having a particle diameter of from 3 to 20 nm. The hydrophilic outermost layer is superior in hydrophilicity and stain resistance, due to the photocatalytic oxidative activity of titania to remove stains attached to the surface of the hydrophilic outermost layer. Furthermore, the hydrophilic outermost layer is improved in continuity, due to the use of the amorphous oxide. In other words, it is assumed that void spaces of titania grain boundaries are occupied by or filled with the amorphous oxide. With this, it is assumed that the hydrophilic outermost layer becomes continuous in structure, and thus is substantially improved in abrasion resistance. Still furthermore, the hydrophilic outermost layer is improved in duration of hydrophilicity, since the silica particles has a large amount of physically adsorbed water. It should be noted that the amorphous oxide is different from the silica particles, even if the amorphous oxide is an amorphous silica. In fact, the particle diameter of the amorphous oxide is far smaller than that of the silica particles. Furthermore, a combination of the titania and the amorphous oxide constitute the hydrophilic outermost layer's matrix phase (continuous phase). In contrast, the silica particles constitute the disperse phase distributed over the matrix phase.

According to the present invention, there is provided a method for producing the above-mentioned hydrophilic article. This method comprises sequential steps of (a) providing a sol mixture comprising a first sol containing a precursor of the titania, a second sol containing a precursor of the amorphous oxide, and a silica colloidal solution containing the silica particles; (b) applying the sol mixture to the substrate, thereby to form thereon a precursory film; and (c) baking the precursory film into the outermost layer. It becomes possible to effectively produce the hydrophilic article by this method. In this method, the first sol turns into a gel through hydration and polycondensation of a titania precursor then into the titania. Similarly, the second sol turns into a gel through hydration and polycondensation of an amorphous oxide precursor and then into the amorphous oxide. The step (c) can be conducted at a temperature of from 400 to 850° C. With this, the hydrophilic outermost layer becomes further improved in hydrophilicity, duration of hydrophilicity and abrasion resistance. If it is lower than 400° C., the outermost layer may become insufficient in abrasion resistance. If it is higher than 850° C., the anatase-type titania may turn into the rutile-type titania. With this, the photocatalytic activity of titania may substantially be lowered.

DESCRIPTION OF THE PREFERRED EMBODIMENTS

As stated above, the hydrophilic film formed on a substrate has the above-mentioned hydrophilic outermost layer.

As will be clarified hereinafter, the hydrophilic film may be composed of only the outermost layer or may have a metal oxide interlayer interposed between the substrate and the outermost layer. This outermost layer is hydrophilic, due to the inclusion of titania therein. Furthermore, when the exposed surface of the outermost layer is stained with contaminants such as dust, these contaminants are decomposed and thus removed therefrom by the photocatalytic oxidative activity of titania therein. This titania may be in the amorphous form or in the anatase-type or rutile-type crystal form. Of these, the anatase-type titania is particularly preferable, because it is the highest in the photocatalytic activity.

In the invention, the material used for the substrate is not particularly limited, and can be selected from various conventional ones such as metal and glass.

As stated above, the hydrophilic outermost layer comprises the amorphous oxide, in addition to the titania and the silica particles. The second sol may contain a precursor of an amorphous oxide selected from the group consisting of silica, a double oxide of silica and alumina, and a double oxide of silica and zirconia. Of these, a sol containing a silica precursor is preferably used, since the hydrophilic outermost layer becomes substantially improved in abrasion resistance.

The mechanism of the function of the amorphous oxide in the outermost layer can be speculated as follows. If the amorphous oxide is not included in the outermost layer, the outermost layer itself may become brittle, due to many void spaces in the boundaries between the titania crystal grains. Thus, when this outermost layer receives a stress, it may have a brittle fracture and thus may exfoliate from the substrate. In contrast, if the amorphous oxide is included in the outermost layer, it is assumed that the above void spaces are occupied by or filled with the amorphous oxide. That is, the amorphous oxide is assumed to serve as a binder for binding together the titania crystal grains. With this, the outermost layer is substantially improved in abrasion resistance. As stated above, the particle diameter of the amorphous metal oxide is far less than that of the silica particles and is difficult to be measured by general known methods.

As mentioned above, the hydrophilic outermost layer is composed of a matrix phase and a disperse phase distributed over the matrix phase. The matrix phase (continuous phase), which mainly forms the skeleton of the hydrophilic outermost layer, is constituted of a combination of the titania and the amorphous oxide, and the disperse phase is constituted of the silica fine particles, which may cohere into aggregates. The silica particles make the surface of the outermost layer uneven and improve the outermost layer in water holding capacity.

In case that an amorphous silica precursor is used in the preparation of the hydrophilic outermost layer, it is generally assumed that Si—O—Ti bond is generated by the first sol containing a titania precursor and the second sol containing an amorphous silica precursor. These first and second sols turn is into a gel through dehydration and polycondensation. It is further assumed that the Si—O—Ti bond interferes with the crystallization of titania. However, the first sol is far higher than the second sol in the rate of dehydration and polycondensation. Therefore, as long as the amount of the second sol containing an amorphous silica precursor is up to the upper limit, the titania can crystallize and maintain the photocatalytic activity. In this connection, the amorphous oxide (e.g., silica) is in an amount of from 5 to 25 wt % based on the total weight of the hydrophilic outermost layer.

If it is less than 5 wt %, the outermost layer becomes insufficient in abrasion resistance. Thus, it may exfoliate from the substrate in a traverse-type abrasion resistance test or another test. If it is greater than 25 wt %, the amount of titania becomes too small to obtain a sufficient photocatalytic activity of titania.

In the invention, the weight ratio of the amorphous oxide to the titania is preferably from 6:94 to 13:84. With this, the photocatalytic activity of titania becomes sufficient. Thus, organic matters attached to the hydrophilic outermost layer may be decomposed even by ultraviolet rays of a cloudy day, in order to maintain its hydrophilicity. If it is less than 6:94, the hydrophilic outermost layer may become insufficient in abrasion resistance. If it is greater than 13:84, the outermost layer may become insufficient in photocatalytic activity to decompose organic matters attached to the outermost layer.

When the surface of the hydrophilic outermost layer is stained with organic contaminants such as hydrocarbons, these contaminants are decomposed by the photocatalytic oxidative activity (photodecomposition property) of titania under a condition that the ultraviolet radiation intensity is relatively high. With this, the outermost layer is maintained in hydrophilicity. However, it becomes difficult to maintain hydrophilicity of the outermost layer, under a condition that the ultraviolet radiation intensity is not relatively high, for example, in the night or in the rainy weather. This problem can be solved by including in the outermost layer the silica particles having a particle diameter of from 3 to 20 nm. The silica fine particles have a large amount of physically adsorbed water. It is preferable that the silica particles are in an amount of from 10–50 wt %, based on the total weight of the outermost layer. With this, the weight ratio of the matrix phase, which is a combination of the titania and the amorphous oxide, to the disperse phase of the silica particles becomes good such that the outermost layer becomes superior in photocatalytic activity, abrasion resistance and duration of hydrophilicity. If it is less than 10 wt %, the outermost layer may become insufficient in duration of hydrophilicity. If it is greater than 50 wt %, the outermost layer may become insufficient in photocatalytic activity and abrasion resistance. The particle diameter of the silica fine particles is preferably from 3 to 15 nm, more preferably from 5 to 10 nm. If it is less than 5 nm, the silica fine particles may be formed into aggregates. With this, the outermost layer may be lowered in hydrophilicity and its duration. If it is greater than 10 nm, the silica fine particles may become inferior in dispersibility. With this, the outermost layer may become inferior in abrasion resistance and external appearance (transparency).

In the invention, it is preferable that the outermost layer has a thickness of from 50 to 110 nm, more preferably from 70 to 90 nm. This is one factor in making the outermost layer sufficient in abrasion resistance. If it is less than 50 nm, the outermost layer may become insufficient in duration of hydrophilicity. If it is greater than 110 nm, it may become difficult to bend the substrate coated with the outermost layer, for example, in the preparation of a curved mirror. Furthermore, the outermost layer may become insufficient in abrasion resistance.

In case that the substrate is made of soda-lime glass, it is optional to interpose an interlayer (metal oxide layer) between the substrate and the outermost layer. The material used for the interlayer is not particularly limited, as long as there can be prevented the migration of sodium ion from the soda-lime glass into the outermost layer. This material is preferably selected from silica, alumina, a double oxide of silica and alumina, and the like. Of these, silica is preferably used, in view of its capability and productivity. If sodium ion presents in the outermost layer, it reacts with titania, thereby to form $TiO_{2-x}Na_x$. This compound provides a site to reunite holes and electrons, which have been generated by ultraviolet rays. This may reduce photocatalytic activity of titania. It is preferable that the interlayer has a thickness of from 50 to 110 nm, more preferably from 70 to 90 nm. If it is less than 50 nm, it may become difficult to prevent the above-mentioned migration of sodium ion. With this, the outermost layer may be lowered in photocatalytic activity. If it is greater than 110 nm, it may become difficult to bend the substrate coated with the interlayer.

It is preferable that the light source contains ultraviolet rays having wavelengths of up to 400 nm, in order to decompose contaminants disposed on the outermost layer, by the photocatalytic activity of titania. Examples of the light source usable in the invention are sunbeam, mercury lamp, fluorescent lamp, halogen lamp, xenon short-arc lamp, and laser beam. In the invention, it is not necessary to provide an artificial light source, but the natural light such as sunbeam will suffice. It is optional to provide an artificial light source in a manner that the outermost layer is directly exposed to the light rays from the light source.

In the invention, the second sol, which turns into the amorphous oxide, may be prepared through hydrolysis and subsequent dehydration and polycondensation of a metal alkoxide. Similarly, the first sol, which turns into the titania, may be prepared from a titanium alkoxide such as titanium tetraisopropoxide or tetraethoxy titanium. In the preparation of the first and/or second sol, it is optional to use a ligand to adjust the degree of the reactivity. In contrast with the first and second sols, the silica colloidal solution contains the silica particles dispersed therein. The silicon particles are distributed over the matrix phase of the outermost layer, in the preparation of the outermost layer.

In the invention, exemplary commercial product names of the second sol containing an amorphous silica's precursor are SUPER-CERA of Daihachi Kagaku Kogyosho Co., CERAMICA of Nichi-ita Kenkyusho Co., HAS of Col Coat Co., ATRON NSi-500 of Nippon Soda Co., Ltd., and CGS-DI-0600 of Chisso Co. Exemplary commercial product names of the second sol containing an amorphous zirconia's precursor are TA-10 and TA-15 of Nissan Chemical Industries, Ltd. and AZS-A, AZS-NB and AZS-B of Nihon Shokubai Kagaku Kogyo Co. Exemplary commercial product names of the second sol containing an amorphous alumina's precursor are ALUMINA SOL 100, ALUMINA SOL 200 and ALUMINA SOL 520 of Nissan Chemical Industries, Ltd., and CATALLOID AS-3 of Shokubai Kagaku Kogyo Co.

In the invention, it is optional to dilute the first and/or second sol with water or an organic solvent. This organic solvent is not particularly limited. Examples of the organic solvent are primary alcohols such as methanol, ethanol and propyl alcohol; secondary alcohols such as isopropyl alcohol; tertiary alcohols such as tertiary butanol; ketones such as acetone and methyl ethyl ketone; ethers; aliphatic, aromatic and alicyclic hydrocarbons such as benzene, toluene, xylene, chloroform, pentane, hexane and cyclohexane; and mixtures of at least two of these.

In the invention, it is optional to add an additive to the first and/or second sol, in order to improve the hydrophilic outermost layer in photocatalytic activity. This additive is, for example, at least one selected from metal sulfates, metal nitrates, metal carbonates, metal acetates, metal stearate, metal halides (e.g., metal chlorides and metal iodides), and condensates of these.

In the invention, the manner of applying the sol mixture to the substrate or to the interlayer is not particularly limited. It may be dip coating, spraying, flow coating, or spin coating.

In case that the hydrophilic article according to the invention is used as an automotive curved outside mirror, the hydrophilic article may be produced by a method comprising steps of:

(a) applying a sol containing a silica precursor to the substrate, for example, by dip coating or spin coating, thereby to form thereon a first precursory film;

(b) drying the first precursory film into the interlayer made of a silica;

(c) providing a sol mixture comprising a first sol containing a precursor of the titania, a second sol containing a precursor of the amorphous oxide, and a silica colloidal solution containing the silica particles;

(d) applying the sol mixture to the interlayer, for example, by dip coating or spin coating, thereby to produce a first precursor of the hydrophilic article;

(e) preliminarily baking the first precursor at a first temperature into a second precursor of the hydrophilic article; and (f) bending the second precursor into the hydrophilic article, while the second precursor is baked at a second temperature that enables the bending of the second precursor.

The above step (b) is conducted at a temperature preferably of from 150 to 450° C. If it is lower than 150° C., the photocatalytic activity may become insufficient. If it is higher than 450° C., it may become difficult to bend the substrate coated with the interlayer. The first temperature of the above step (e) is preferably from 500 to 600° C. If it is lower than 500° C., the outermost layer may become insufficient in hardness. If it is higher than 600° C., the outermost layer may become too high in hardness. With this, it may become difficult to bend the substrate coated with the outermost layer. The above step (f) is conducted at the second temperature, which is not lower than the softening point thereof, for example, using an unglazed mold made of a mixture of silica sand and clay. The first temperature of the step (e) is preferably from 500 to 600° C., in order to prevent scratches of the outermost layer even if the surface of the outermost layer is rubbed against the surface of the unglazed mold. The second temperature of the step (f) is preferably from 600 to 750° C. If it is lower than 600° C., the softening of the glass substrate may become insufficient. With this, the outermost layer may become inferior in water resistance. If it is higher than 750° C., the period of time for annealing the hydrophilic article may become too long. Thus, the hydrophilic article may become too low in productivity.

The following nonlimitative examples are illustrative of the present invention.

EXAMPLE 1

In this example, the hydrophilic article was prepared, as follows. At first, a soda glass substrate having widths of 100 mm and a thickness of 1.9 mm was washed with neutral detergent, then water and then ethanol, and then was dried. Then, a silica precursor sol, ATRON NSi-500 (trade name) of Nippon Soda Co., Ltd., was applied to the glass substrate. Then, the coated glass substrate was baked at 170° C., thereby to form thereon a silica film (interlayer) having a thickness of from 75 to 90 nm.

Separately, a 0.5 mol/L titanium alkoxide solution was prepared by dissolving titanium tetraisopropoxide in ethanol. Then, this solution was diluted with 1 mol of 2-methyl-2,4-pentanediol, relative to 1 mol of the titanium alkoxide. The resultant solution was refluxed for 1 hr. After that, the heated solution was cooled down to room temperature, and then nitric acid was added thereto to make the solution acid. Then, to this solution there was added water in an amount equimolar with the titanium alkoxide. Then, this solution was refluxed at room temperature for 1 hr, thereby to obtain a titania precursor sol (first sol).

To the obtained titania precursor sol, there was added a commercial silica precursor sol (second sol), ATRON NSi-500 (trade name) of Nippon Soda Co., Ltd., in an amount such that the outermost layer contained 11 wt % of $SiO_2$, based on the total weight of $TiO_2$ and $SiO_2$. Then, to this sol mixture there was added a commercial colloidal silica, ST-X (trade name) of Nissan Chemical Industries, Ltd., having a particle diameter's range of from 7 to 12 nm, in an amount such that the outermost layer contained 10 wt %, based on the total weight of the outermost layer, of silica particles derived from this colloidal silica. The resultant sol mixture was stirred for 1 hr.

Then, the obtained sol mixture was applied to the coated glass substrate by spin coating at a spinning rate of 1,000 rpm. The obtained film was air-dried and then baked at 550° C. for 30 min and then at 650° C. for 10 min, thereby to form on the interlayer a transparent outermost layer having a thickness of 75 nm. The outermost layer had a chemical composition shown in Table 1.

The external appearance of the obtained test sample (i.e., the glass substrate coated with the outermost layer) was observed with the naked eye. The result of this test is shown in Table 2, wherein A means good external appearance (transparent), B means somewhat non-transparent, and C means non-transparent.

Then, there was measured the initial contact angle of water drop disposed on the outermost layer. The result of this a test in hydrophilicity is shown in Table 2, wherein AA means excellent hydrophilicity because of a contact angle of 2–3 degrees, A means good hydrophilicity because of a contact angle of 4–5 degrees, B means somewhat inferior hydrophilicity because of a contact angle of 10–20 degrees, and C means inferior hydrophilicity because of a contact angle of at least 20 degrees.

After the measurement of the initial contact angle, the test sample was allowed to stand still in a darkroom for 168 hr. During this test, the contact angle was measured every 24 hr. With this, the contact angle was found to increase gradually. It was found to be 8.0 degrees after a lapse of 168 hr. The result of this test (duration of hydrophilicity) after a lapse of 168 hr is shown in Table 2, wherein AA means excellent because of a contact angle of about 10 degrees, A means good because of a contact angle of about 15 degrees, B means somewhat inferior because of a contact angle of about 20 degrees, and C means inferior because of a contact angle of at least 20 degrees.

Then, there was determined the photodecomposition rate ($\eta$) of the outermost layer. The result is shown in Table 2, wherein AA means excellent because of a photodecomposition rate of 80–100%, A means good because of a photodecomposition rate of 70–80%, and C means inferior because of a photodecomposition rate of not higher than 70%. This photodecomposition rate is expressed by the following equation:

$$\eta = [(\theta_1 - \theta_2)/(\theta_1 - 5°)] \times 100,$$

where $\theta_1$ is the contact angle of water drop disposed on the outermost layer that has been dipped into an acetone solution containing 0.1% oleic acid and then air-dried, and $\theta_2$ is the contact angle of water drop disposed on that which has been irradiated, after the measurement of $\theta_1$, with ultraviolet rays having an intensity of 1.5 $mW/cm^2$ for 4 hr, using an ultraviolet irradiation device. When $\theta_2$ was less than 5 degrees, $\eta$ was decided to be 100%. In this example, $\eta$ was 100%. A value of the photodecomposition rate that was higher than 70% was judged to be satisfactory, and that was lower than 70% was judged to be unsatisfactory or inferior, with respect to the photodecomposition capability of the outermost layer.

Furthermore, the outermost layer of the test sample was subjected to a traverse-type abrasion resistance test. In this test, a sliding member coated with canvas was moved on the outermost layer in a sliding manner until 5,000 reciprocations, by adding a load of 100 g to the sliding member. The result of this test is shown in Table 2 wherein AA means excellent because the outermost layer did not have scratches thereon nor exfoliate from the interlayer and was maintained in transparency, A means good because of no scratches nor exfoliation thereof, and C means inferior because of scratches and exfoliation thereof.

Furthermore, a humidity resistance test was conducted by allowing the test sample to stand still in an atmosphere of 40° C. and a relative humidity of 98% for 100 hr. After that, the external appearance of the test sample was observed, and $\eta$ of the outermost layer was measured in the same manner as above. With this, $\eta$ was found to be 80%. The results of this test and the following water resistance test and salt water test are shown in Table 2 wherein A means good because of no change in external appearance and a photodecomposition rate of higher than 70%, and C means inferior because the outermost layer was not maintained in transparency, exfoliated from the interlayer and had a photodecomposition rate of less than 70%.

Furthermore, a water resistance test was conducted by immersing the test sample in hot water for 100 hr. After that, the external appearance of the test sample was observed, and $\eta$ of the outermost layer was measured in the same manner as above. With this, $\eta$ was found to be 75%.

Furthermore, a salt water resistance test was conducted by immersing the test sample in 2% salt water. After that, the external appearance of the test sample was observed, and $\eta$ of the outermost layer was measured in the same manner as above. With this, the change of the external appearance was not found, and $\eta$ was found tone 70%.

TABLE 1

| | Outermost Layer Composition (wt %) | | |
|---|---|---|---|
| | $TiO_2$ | $SiO_2$ | Silica Particles |
| Example 1 | 80 | 10 | 10 |
| Example 2 | 75 | 15 | 10 |
| Example 3 | 70 | 5 | 25 |
| Example 4 | 65 | 25 | 10 |
| Example 5 | 80 | 10 | 10 |
| Com. Ex. 1 | 86 | 4 | 10 |
| Com. Ex. 2 | 62 | 28 | 10 |
| Com. Ex. 3 | 80 | 10 | 10 |
| Com. Ex. 4 | 80 | 0 | 20 |
| Com. Ex. 5 | 80 | 20 | 0 |
| Com. Ex. 6 | 80 | 0 | 20 |
| Com. Ex. 7 | 80 | 20 | 0 |

TABLE 2

| | External Appearance | Photo-decomposition Rate | Hydro-philicity | Duration of Hydro-philicity | Abrasion Resistance | Humidity Resistance | Water Resistance | Salt Water Resistance |
| --- | --- | --- | --- | --- | --- | --- | --- | --- |
| Example 1 | A | AA | AA | AA | A | A | A | A |
| Example 2 | A | A | A | A | AA | A | A | A |
| Example 3 | A | A | AA | AA | A | A | A | A |
| Example 4 | A | A | A | A | AA | A | A | A |
| Example 5 | A | A | A | A | A | A | A | A |
| Com. Ex. 1 | A | AA | A | A | C | A | A | A |
| Com. Ex. 2 | A | C | A | A | AA | A | A | A |
| Com. Ex. 3 | B | A | B | B | C | A | A | A |
| Com. Ex. 4 | A | A | A | A | C | C | C | C |
| Com. Ex. 5 | A | A | C | C | A | C | C | C |
| Com. Ex. 6 | A | A | A | A | C | C | C | C |
| Com. Ex. 7 | A | A | C | C | A | C | C | C |

EXAMPLES 2–4 AND COMPARATIVE EXAMPLE 1–2

In each of these examples and comparative examples, Example 1 was repeated except in that the preparation of the sol mixture was modified such that the chemical composition of the outermost layer was changed as shown in Table 1.

EXAMPLE 5

In this example, Example 1 was repeated except in that the preparation of the sol mixture was modified such that the chemical composition of the outermost layer was changed as shown in Table 1, and that the silica particles of Example 1 were replaced with those having a particle diameter of 17 nm.

Comparative Example 3

In this example, Example 1 was repeated except in that the preparation of the sol mixture was modified such that the chemical composition of the outermost layer was changed as shown in Table 1, and that the silica particles of Example 1 were replaced with those having a particle diameter of 2 nm.

Comparative Example 4

In this example, a silica interlayer was formed on a glass substrate in the same manner as that of Example 1. Then, a dispersion liquid containing a dispersoid of 80 wt % of titania particles and 20 wt % silica particles was applied to the interlayer. Then, the coated glass substrate was baked in the same manner as that of Example 1. The obtained test sample was subjected to the same evaluation tests as those of Example 1. The results are shown in Table 2.

Comparative Example 5

In this example, a silica interlayer was formed on a soda-lime glass substrate in the same manner as that of Example 1. Then, a liquid containing a mixture of titania particles and the silica precursor sol of Example 1 was applied to the interlayer. Then, the coated glass substrate was baked in the same manner as that of Example 1, thereby to form on the interlayer a hydrophilic outermost layer having a chemical composition shown in Table 1. The obtained test sample was subjected to the same evaluation tests as those of Example 1. The results are shown in Table 2.

Comparative Example 6

In this example, a silica interlayer was formed on a soda-lime glass substrate in the same manner as that of Example 1. Then, a liquid containing a mixture of the titania precursor sol and the silica particles of Example 1 was applied to the interlayer. Then, the coated glass substrate was baked in the same manner as that of Example 1, thereby to form on the interlayer a hydrophilic outermost layer having a chemical composition shown in Table 1. The obtained test sample was subjected to the same evaluation tests as those of Example 1. The results are shown in Table 2.

Comparative Example 7

In this example, a silica interlayer was formed on a soda-lime glass substrate in the same manner as that of Example 1. Then, a liquid containing a mixture of the titania precursor sol and the silica precursor sol of Example 1 was applied to the interlayer. Then, the coated glass substrate was baked in the same manner as that of Example 1, thereby to form on the interlayer a hydrophilic outermost layer having a chemical composition shown in Table 1. The obtained test sample was subjected to the same evaluation tests as those of Example 1. The results are shown in Table 2.

What is claimed is:
1. A hydrophilic article comprising:
   (a) a substrate; and
   (b) a hydrophilic film formed on said substrate, said film having a hydrophilic outermost layer, said outermost layer comprising:
      (1) a titania;
      (2) an amorphous oxide in an amount of from 5 to 25 wt % based on a total weight of said outermost layer; and
      (3) silica particles having a particle diameter of from 3 to 20 nm.
2. A hydrophilic article according to claim 1, wherein said outermost layer is prepared by a method comprising sequential steps of:
   (a) providing a sol mixture comprising a first sol containing a precursor of said titania, a second sol containing a precursor of said amorphous oxide, and a silica colloidal solution containing said silica particles;
   (b) applying said sol mixture to said substrate, thereby to form thereon a precursory film; and
   (c) baking said precursory film into said outermost layer.
3. A hydrophilic article according to claim 1, wherein said amorphous oxide is a silica.
4. A hydrophilic article according to claim 1, wherein a weight ratio of said amorphous oxide to said titania is from 6:94 to 13:84.
5. A hydrophilic article according to claim 1, wherein said silica particles are in an amount of from 10 to 50 wt % based on the total weight of said outermost layer.

6. A hydrophilic article according to claim 1, wherein said silica particles have a particle diameter of from 3 to 15 nm.

7. A hydrophilic article according to claim 6, wherein said silica particles have a particle diameter of from 5 to 10 nm.

8. A hydrophilic article according to claim 1, wherein said outermost layer has a thickness of from 50 to 110 nm.

9. A hydrophilic article according to claim 1, wherein said substrate is made of a soda-lime glass.

10. A hydrophilic article according to claim 9, wherein said hydrophilic film further comprises an interlayer interposed between said substrate and said outermost layer, such that there is prevented a migration of a sodium ion from said substrate to said outermost layer.

11. A hydrophilic article according to claim 10, wherein said interlayer is prepared by a method comprising sequential steps of:

(a) applying a sol containing a silica precursor to said substrate, thereby to form thereon a precursory film; and (b) baking said precursory film into said interlayer made of a silica.

12. A hydrophilic article according to claim 10, wherein said interlayer has a thickness of from 50 to 110 nm.

13. A hydrophilic article according to claim 1, wherein said titania comprises an anatase-type titania.

14. A hydrophilic article according to claim 1, wherein said hydrophilic article is an automotive window glass pane.

15. A hydrophilic article according to claim 1, wherein said hydrophilic article is an automotive outside mirror.

16. A hydrophilic article according to claim 1, wherein said hydrophilic outermost layer comprises a matrix phase and a disperse phase distributed over said matrix phase, said matrix phase comprising a combination of said titania and said amorphous oxide, said disperse phase comprising said silica particles.

17. A hydrophilic article according to claim 1, wherein said amorphous oxide has a particle diameter that is substantially smaller than that of said silica particles.

18. A method for producing a hydrophilic article having a substrate coated with a hydrophilic film, said hydrophilic film having a hydrophilic outermost layer comprising a titania, an amorphous oxide, and silica particles, said method comprising sequential steps of:

(a) providing a sol mixture comprising a first sol containing a precursor of said titania, a second sol containing a precursor of said amorphous oxide, and a silica colloidal solution containing said silica particles;

(b) applying said sol mixture to said substrate, thereby to form thereon a precursory film; and (c) baking said precursory film into said outermost layer.

19. A method according to claim 18, wherein the step (c) is conducted at a temperature of from 400 to 850° C.

20. A method for producing a hydrophilic article, said hydrophilic article having a substrate, a hydrophilic outermost layer formed on said substrate, and an interlayer interposed between said substrate and said hydrophilic outermost layer, said hydrophilic outermost layer comprising a titania, an amorphous oxide, and silica particles, said method comprising steps of:

(a) applying a sol containing a silica precursor to said substrate, thereby to form thereon a first precursory film;

(b) drying said first precursory film into said interlayer made of a silica;

(c) providing a sol mixture comprising a first sol containing a precursor of said titania, a second sol containing a precursor of said amorphous oxide, and a silica colloidal solution containing said silica particles;

(d) applying said sol mixture to said interlayer, thereby to produce a first precursor of said hydrophilic article;

(e) preliminarily baking said first precursor at a first temperature into a second precursor of said hydrophilic article; and (f) bending said second precursor into said hydrophilic article, while said second precursor is baked at a second temperature that enables said bending of said second precursor.

21. A method according to claim 20, wherein the step (b) is conducted at a temperature of from 150 to 450° C., and said first and second temperatures of the steps (e) and (f) are from 500 to 600° C. and from 600 to 750° C., respectively.

* * * * *